Feb. 21, 1933. J. F. LITTOOY 1,898,673
SPREADER FOR SPRAY COMPOSITIONS
Filed Sept. 23, 1929
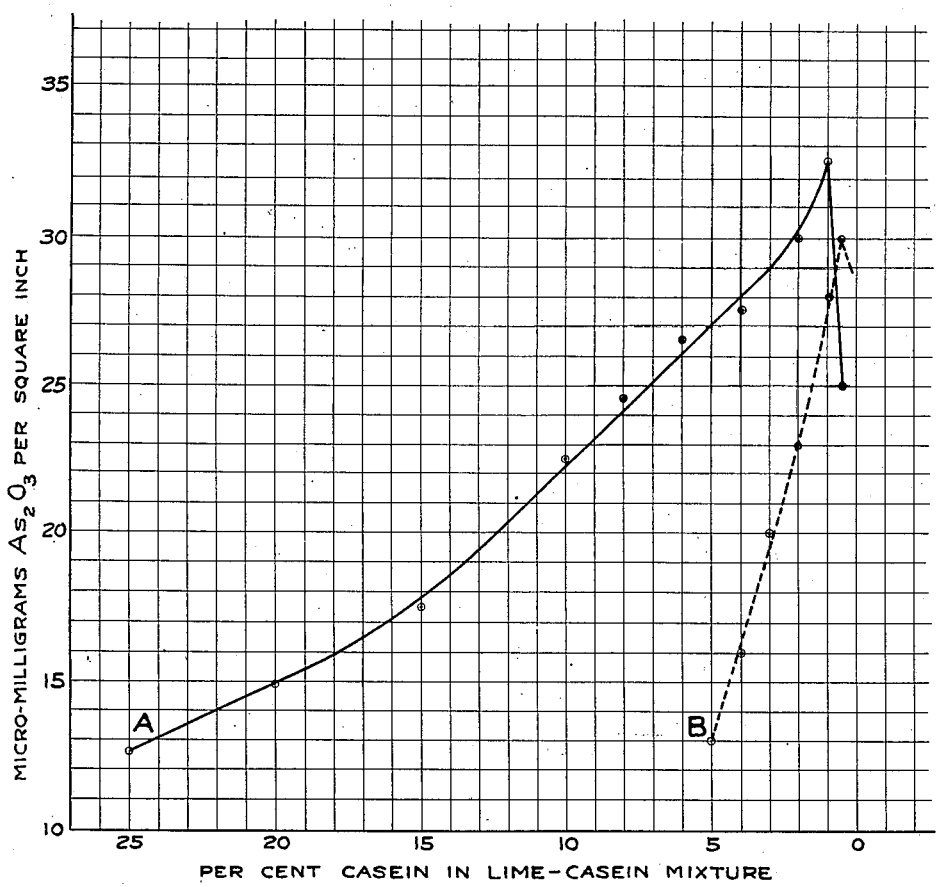
INVENTOR
JOHN F. LITTOOY
BY
HIS ATTORNEY Patented Feb. 21, 1933

1,898,673

UNITED STATES PATENT OFFICE

JOHN F. LITTOOY, OF SAN FRANCISCO, CALIFORNIA, ASSIGNOR TO HERCULES GLUE COMPANY, OF SAN FRANCISCO, CALIFORNIA, A CORPORATION OF CALIFORNIA

SPREADER FOR SPRAY COMPOSITIONS

Application filed September 23, 1929. Serial No. 394,490.

My invention relates to liquid spray compositions containing insecticides and/or fungicides, and particularly to a spreader for such compositions.

An object of the invention is the provision of a spreader comprising ingredients, the proportions of which may be varied to fix, regulate and control the deposit of insecticide and/or fungicide per unit surface area of an object sprayed.

Another object of the invention is the provision of a new and improved spreader which may be employed with more satisfactory results than spreaders heretofore used.

A further object of the invention is the provision of a spreader which may be employed at a decreased cost to the user.

My invention possesses other objects and valuable features, some of which will be set forth in the following description of my invention which is illustrated in the drawing forming part of the specification. It is to be understood that I do not limit myself to the showing made by the said description and drawing, as I may adopt varying forms of my invention within the scope of the claims.

To prevent the destruction of fruit and other vegetation by insects and parasites, spray compositions such as those comprising a mixture of water and an insecticide and/or fungicide are employed. Arsenicals such as lead arsenate and calcium arsenate are toxic substances frequently used. Other toxic substances such as Bordeaux mixture, lime-sulfur solution and nicotine are often employed. Also oil-water emulsions, which may or may not contain toxic substances such as those described, may be used for the purpose.

In order to obtain adequate protection of the object sprayed, it is recognized that the spray composition should take hold readily to effect a thorough wetting of the object; and that the insecticide and/or fungicide be uniformly distributed (called spreading) on the surface of the object. As a matter of economy, it is greatly desirable that a maximum uniform coverage of spray material be obtained from a fixed quantity of the spray composition. Spreaders heretofore employed are supposed to accomplish the above purpose, but have been greatly deficient in regulating the degree and maximum deposit of spray composition, which my invention accomplishes.

Numerous spreaders, under various trade names, are on the market; and of these, the so-called casein or calcium caseinate spreaders are used for the most part. Such casein spreaders generally comprise a mechanical mixture of hydrated lime and powdered casein in the proportion of 75% lime and 25% casein, as recommended in the Oregon Agricultural College Experiment Station, Bulletin 169, "Insecticide Investigations", by Professor A. L. Lovett. With an arsenical such as lead arsenate as the insecticide, it is general practice to employ approximately two pounds of the arsenical for each 100 gallons of water as the spray mixture, and approximately one pound of the described spreader added to such mixture.

The foregoing spreader contains a relatively large quantity of casein which renders the cost thereof high. Also, in the fixed proportion of lime to casein recommended, the maximum deposit of spray material used does not obtain. In such proportion, there is approximately sufficient lime to convert the casein, in the liquid spray composition, into dispersable calcium caseinate; and very little or no excess lime is present when such spreader is placed in the liquid spray composition.

Referring to the drawing:

The figure illustrates by curves the regulation of the toxic deposit control obtainable by the use of the spreaders of my invention.

In terms of broad inclusion, I have found that by using a spreader comprising a protein such as casein, and a base such as lime, in which there is more than sufficient base to convert the protein into a water soluble or water dispersable alkali proteinate, an efficient spreader is provided in which lesser quantities of expensive protein materials may be employed than that recommended in the mentioned bulletin. Also, by regulating the quantity of base with reference to the protein, the deposit of toxic substance per unit area of the object may be controlled. The controlling of toxic deposit is important, since, without control, it is possible to deposit too much of toxic substance and thereby cause damage, or to deposit quantities insufficient to be efficient.

In greater detail, the spreader composition of my invention comprises a mechanical mixture of a protein such as powdered casein, and a base such as powdered hydrated lime, in which the quantity of casein by weight is less than 25% and preferably less than 15% the total quantity by weight of lime (on the basis of hydrated lime) and casein. In other words, the quantity of lime is in excess of that sufficient to convert the casein into a water soluble or dispersable caseinate in the liquid spray composition.

Using a standard liquid spray composition, which for example may contain approximately 2 pounds of arsenical, such as lead arsenate, for each 100 gallons of water, I preferably employ about ½ pound of my spreader, in comparison to 1 pound recommended for general practice. As illustrated by the curve A in the drawing (in which the abscissa indicates the per cent of casein in the ½ pound of lime-casein spreader mixture, and the ordinate the deposit of arsenic trioxide, $As_2O_3$, in micromilligrams per square inch), when the spreader contains 24% casein and 76% lime, the deposit of toxic substance is found to be 13 micromilligrams per square inch. As indicated by the curve A, the toxic deposit increases upon decrease of the amount of casein and increase of the amount of lime; a peculiarity being that, as the casein is decreased and lime increased, it was found that spreading with respect to toxic deposit was most efficient within certain points.

These points are when the spreader comprises 4 to 8% casein, the toxic deposit being 24 to 28 micromilligrams per square inch. Although the toxic deposit within these limits is not a maximum as seen from curve A, most desirable spreading efficiency is found to exist. When the casein is below 4%, spreading occurs with more difficulty, although toxic deposit increases up to 1% casein. Below 1% casein, uniform spreading does not readily occur, and the toxic deposit is inclined to be spotty. Above 25% casein, that is, when free casein is present in the spray liquid, the toxic deposit is found to be greatly lowered with reference to lesser quantities of casein, and is found to be approximately equal to that of 25% casein.

The points from which curve A is determined were obtained by using the described standard liquid spray in the proportion of 2 pounds of arsenical, 100 gallons of water and ½ pound of lime-casein spreader, in which there were different amounts of casein and lime. Quantities of casein used were 25%, 20%, 15%, 10%, 8%, 6%, 4%, 2%, 1% and ½%. The liquid spray compositions were sprayed on known areas of apples or glass surfaces waxed to simulate the surface of a fruit such as an apple, and the toxic deposit determined and calculated in accordance with the usual standard chemical practice for making analytical determinations of this character.

By mixing more hydrated lime either to the ½ pound lime-casein mixture before adding it to the spray liquid, or to the described liquid spray containing ½ pound of lime-casein mixture, it was found that lesser quantities of casein might be employed in the ½ pound mixture and still give toxic deposits within the ranges noted by curve A. For example, and as indicated by curve B, using a spreader comprising 1½ pounds of additional hydrated lime with ½ pound of the lime-casein mixture containing 5% casein, the toxic deposit is substantially equivalent to that obtained when ½ pound of the lime-casein mixture containing 24% casein is employed alone, and the spreading efficiency substantially the same.

Still employing a spreader comprising 1½ pounds of additional hydrated lime and ½ pound of lime-casein mixture, the toxic deposit, as indicated by curve B, increases rapidly as the percent of casein in the ½ pound of lime-casein mixture decreases, the maximum deposit occurring when the quantity of casein is ½%. The most feasible spreading, however, was found to exist not at the maximum deposit of toxic substance, but within the points where the toxic deposit is substantially the same as that of curve A, viz., 20 to 28 micromilligrams per square inch. Within these limits, the quantity of casein in the ½ pound lime-casein mixture is between 1 to 3%, in comparison with 4% to 8% casein when the ½ pound lime-casein mixture is used alone.

Curve B was obtained in a manner similar to that of curve A, and by employing 5%, 4%, 3%, 2%, 1% and ½% of the casein in the ½ pound of lime-casein mixtures plus the additional 1½ pounds of lime, to fix the points plotted.

From the preceding description, it is seen that by varying the quantity of excess base, the toxic deposit may be definitely controlled within wide limits. Also, very small quantities of casein may be employed with large quantities of alkali, to accomplish desirable results. Furthermore, I have found that lesser quantities of the toxic spray materials in the liquid spray composition (containing an excess of lime, and alkali-caseinate) may be used, and give a more efficient toxic deposit than larger quantities of toxic spray materials when containing no excess lime.

In place of the casein in the spreader, other proteins such as glue, dried skimmed milk, blood albumen, peanut meal and soy bean meal, will give similar results. In place of hydrated lime, it is obvious that an alkali such as calcium oxide may be used, it being apparent that for a predetermined quantity of hydrated lime, a lesser quantity of the oxide should be employed. Other bases such as caustic soda, may be used in place of lime, but lime is preferred due to its commercial availability and lesser cost.

The spreader is also applicable for use in other spray mixtures besides that specifically referred to for the purpose of illustration. For example, it may be used in various types of arsenical sprays, in sprays containing Bordeaux mixture, lime-sulfur solution, and/or nicotine; also in oil-water emulsions which may or may not contain additional toxic substances such as an arsenical, or nicotine. The ½ pound lime-casein mixtures plotted in curve A, and the ½ pound lime-casein mixtures plus the additional 1½ pounds of hydrated lime plotted in curve B, illustrate the control of toxic deposit obtainable by varying the excess amounts of base and protein for fixed quantities of spreader. It is within the teachings of this invention to employ varying quantities of my spreaders for various specific spray liquids, in which control is obtained by varying the proportions of the ingredients of the spreader.

With the spreader, suitable known deflocculators, such as glue, gums, resins and/or tannin may be employed. In my preferred composition I preferably employ glue as a deflocculator to aid in preventing spotting of toxic deposit, the preferred formula comprising an intimate mixture of:

|   | Per cent by weight |
|---|---|
| Powdered casein | 4 to 8 |
| Powdered hide glue | 1 to 2 |
| Lime (on basis of hydrated lime) | 90 to 95 |

This is preferably used in quantities of approximately ½ pound for each 100 gallons of liquid spray mixture containing 2 pounds or arsenical or the standard Bordeaux mixtures. If more lime is desired, it may be added in accordance with the teachings of curve B. If lime-sulfur solution, nicotine and/or oil are used as the toxic substance, it is preferred to employ twice the amount of spreader as that which would be used for equivalent quantities of arsenical.

It is apparent that the spreader may be prepared before hand by mixing together the powdered ingredients in the desired proportions, and then adding to the liquid-spray as desired; or the individual ingredients may be added to the liquid spray. In view of this, the term "spreader" in the claims is meant to include either the ingredients when compounded before hand for distribution, or when in the spray liquid.

I claim:
1. A spreader for sprays comprising a protein and lime, the quantity of protein being less than 20% of the total quantity of protein and lime calculated on the basis of calcium hydroxide.

2. A spreader for sprays comprising a protein and lime, the quantity of protein being less than 12% of the total quantity of protein and lime calculated on the basis of calcium hydroxide.

3. A spreader for sprays comprising lime, casein and a deflocculator in substantially the following proportions by weight:

|   | Per cent |
|---|---|
| Casein | 4 to 8 |
| Deflocculator | 1 to 2 |
| Lime (on basis of hydrated lime) | 90 to 95 |

In testimony whereof, I have hereunto set my hand.

JOHN F. LITTOOY.

DISCLAIMER 1,898,673.—*John F. Littooy*, San Francisco, Calif. SPREADER FOR SPRAY COMPOSITIONS. Patent dated February 21, 1933. Disclaimer filed September 17, 1937, by the assignee, *Hercules Glue Company*.

Hereby enters this disclaimer to that part of each of claims 1 and 2 in said Letters Patent which provides for a protein content of five per cent or over five per cent and to that part of claim 3 in said Letters Patent which provides for a casein content of five per cent or over five per cent.

[*Official Gazette October 12, 1937.*]